United States Patent
Oosterkamp et al.

[11] Patent Number: 5,857,006
[45] Date of Patent: *Jan. 5, 1999

[54] CHIMNEY FOR ENHANCING FLOW OF COOLANT WATER IN NATURAL CIRCULATION BOILING WATER REACTOR

[75] Inventors: Willem Jan Oosterkamp, Oosterbeek, Netherlands; Wayne Marquino, San Jose, Calif.

[73] Assignee: General Electric Company, San Jose, Calif.

[ * ] Notice: The terminal 15 months of this patent has been disclaimed.

[21] Appl. No.: 347,621

[22] Filed: Dec. 1, 1994

Related U.S. Application Data

[63] Continuation-in-part of Ser. No. 914,132, Jul. 17, 1992, abandoned.

[51] Int. Cl.[6] ............................................. G21C 15/00
[52] U.S. Cl. .......................... 376/377; 376/210; 376/371
[58] Field of Search .................................. 376/210, 370, 376/371, 372–379, 352, 389, 399, 406, 407

[56] References Cited

U.S. PATENT DOCUMENTS

| | | | |
|---|---|---|---|
| 2,994,657 | 8/1961 | Petrick | 204/193.2 |
| 3,057,333 | 10/1962 | Kuhner | 376/371 |
| 3,103,477 | 9/1963 | Mong | 376/406 |
| 3,154,140 | 10/1964 | Esselman et al. | 376/371 |
| 3,213,833 | 10/1965 | Cunningham et al. | 122/34 |
| 3,244,597 | 4/1966 | Tower | 176/18 |
| 3,247,650 | 4/1966 | Kornbichler | 55/185 |
| 3,255,088 | 6/1966 | Sprague et al. | 176/53 |
| 3,284,312 | 11/1966 | West | 376/378 |
| 3,290,221 | 12/1966 | Gorker | 176/28 |
| 3,342,690 | 9/1967 | Stern | 176/54 |
| 4,440,715 | 4/1984 | Sato et al. | 376/210 |
| 4,559,275 | 12/1985 | Matt et al. | 376/352 |
| 4,576,784 | 3/1986 | Kobayashi | 376/352 |
| 4,656,000 | 4/1987 | Sakurai et al. | 376/352 |
| 4,834,937 | 5/1989 | Aspden | 376/377 |
| 4,877,574 | 10/1989 | Suzuki et al. | 376/210 |
| 5,019,328 | 5/1991 | Niino et al. | 376/310 |
| 5,135,711 | 8/1992 | Borchardt etal. | 376/372 |
| 5,180,546 | 1/1993 | Kuijk | 376/371 |
| 5,255,297 | 10/1993 | Bryan | 376/352 |

FOREIGN PATENT DOCUMENTS

| | | |
|---|---|---|
| 1120033 | 12/1961 | Germany . |
| 1119798 | 5/1989 | Japan . |
| 2221079 | 1/1990 | United Kingdom . |

*Primary Examiner*—Harvey E. Behrend
*Attorney, Agent, or Firm*—James E. McGinness

[57] ABSTRACT

A chimney which can be reconfigured or removed during refueling to allow vertical removal of the fuel assemblies. The chimney is designed to be collapsed or dismantled. Collapse or dismantlement of the chimney reduces the volume required for chimney storage during the refueling operation. Alternatively, the chimney has movable parts which allow reconfiguration of its structure. In a first configuration suitable for normal reactor operation, the chimney is radially constricted such that the chimney obstructs vertical removal of the fuel assemblies. In a second configuration suitable for refueling or maintenance of the fuel core, the parts of the chimney which obstruct access to the fuel assemblies are moved radially outward to positions whereat access to the fuel assemblies is not obstructed.

15 Claims, 6 Drawing Sheets

5,857,006

CHIMNEY FOR ENHANCING FLOW OF COOLANT WATER IN NATURAL CIRCULATION BOILING WATER REACTOR

RELATED PATENT APPLICATION

This application is a continuation-in-part application of U.S. patent application Ser. No. 07/914,132 filed on Jul. 17, 1992, now abandoned.

The Government of the United States of America has rights in this invention in accordance with Contract No. DE-AC03-90SF18494 awarded by the Department of Energy.

FIELD OF THE INVENTION

This invention is generally related to means for increasing the core inventory for reactor cooling in the event of accidental shutdown of or loss of coolant in a boiling water nuclear reactor.

BACKGROUND OF THE INVENTION

Boiling water nuclear reactors generally comprise steam-generating plants wherein reactor water coolant is circulated through a core of heat-producing fissionable nuclear fuel to transfer thermal energy from the fuel to the coolant, thereby generating a two-phase steam-water mixture emerging from the fuel core. Using steam-water separators and steam dryers positioned downstream from and above the core, the upward-flowing mixture from the heating core becomes partitioned into its respective phases, whereupon the steam is piped from the reactor vessel for use in steam-driven turbines or other equipment while the liquid water phase is recycled as coolant water.

In typical boiling water reactors used for power generation, reactor coolant water is circulated continuously around a flow path as follows: up through a heat-producing fuel core; then up through a core outlet plenum superimposed above the fuel core which serves to collect and channel all the coolant passing up through the fuel core; then on through an assembly of steam separators positioned above the core outlet plenum; and finally back downward outside of the core, along an annular region (termed the "downcomer") to recycle the liquid coolant and return it to the fuel core. When the reactor is designed as a natural circulation type boiling water reactor, this final flow path outside the core is direct and uninterrupted. A cylindrical member enshrouding the core and extending some distance both above and below the elevations containing the fuel core is positioned between upward-flowing water passing through the reactor core and downward-flowing water recycling back to the lower plenum beneath the core. If the reactor type is a forced circulation reactor, some form of pumping mechanism is positioned outboard of the core shroud member along this portion of the flow path to amplify the pressure head otherwise present in the reactor lower plenum region.

As the coolant passes through the fuel core, heat is transferred from the fuel assembles to the circulating water coolant. The water coolant emerges from the heat-producing fuel core as a two-phase mixture of steam and water, the proportions of which vary depending on such factors as the power output from the fuel, the amount of subcooling present in the feedwater, the total hydrodynamic flow resistance presented by the fuel core structure and its wetted surface, and the amount of orificing representing restrictions to flow immediately prior to the entrance of the coolant into the individual core fuel assemblies.

Conventional fuel assemblies of boiling water reactors are composed of a multiplicity of fuel units, such as rods grouped together in bundles, with each bundle surrounded by an open-ended channel through which water flows longitudinally. These channeled bundles of fuel units are spaced apart from each other to provide intermediate spaces for insertion of control blades. Thus, there are ample areas for coolant bypass flow beyond close proximity to the heat-producing fuel units within a bundle.

Bypass flow coolant water passes through the fuel core without closely encountering the high energy emanating from the fuel and enters the core outlet plenum consisting substantially of saturated liquid with perhaps a small amount of steam. This bypass effluent joins the two-phase steam-water mixtures exiting from individual fuel assemblies comprising the core. These two effluents, with differing ratios of steam contents and, in turn, buoyancy, rise up within the core outlet plenum from the core at different rates. Additionally the steam exit qualities tend to be higher from the central region of the fuel core than from the peripheral region of the fuel core.

Inconsistencies in the steam mass flow and, in turn, buoyancy and rising flow rates produce turbulences and eddies transversely across the moving stream of the mixture progressing upward within the core outlet plenum. This phenomenon of turbulence and eddies within a nuclear reactor is the subject of an article entitled "Peculiarities of the Distribution of Phases in the Updraft Section of a Housed Boiling Reactor" by V. N. Fedulin, G. G. Bartolomei, V. A. Solodkii and V. E. Shmelev, translated from *Atomnaya Energiya*, Vol. 57, No. 6, pp. 385–388, December, 1984, Plenum Publishing Corp. In addition to the turbulence and eddies of the uneven two-phase mixture of steam and water rising from the fuel core up through the core outlet plenum, the density of this mixture of gaseous steam and hot water within the core outlet plenum can be less than 25% that of room-temperature water.

SUMMARY OF THE INVENTION

The present invention is an apparatus for increasing the inventory or quantity of water available for reactor cooling immediately after shutdown of the reactor. In the event of a loss-of-coolant accident or loss of feedwater makeup, this inventory is critical. The apparatus of the invention also provides an arrangement for reducing turbulence and/or eddies of the steam-water mixture rising up through the core outlet plenum while at the same time increasing the area of the annular downcomer and the volume of recycling liquid coolant water contained therein.

The concept of the invention entails modifying the configuration of the chimney defining the core outlet plenum which receives and isolates the upward-flowing mixture of water and steam exiting from the fuel core. In accordance with this modification, the chimney, which inherently blocks vertical removal of the fuel assemblies from the core, can be reconfigured or removed during refueling to allow vertical removal of the fuel assemblies.

In accordance with preferred embodiments of a chimney which is removed in its entirety or in part to facilitate refueling, the chimney is designed to be collapsed or dismantled. Collapse or dismantlement of the chimney reduces the volume required for chimney storage during the refueling operation.

In accordance with alternative preferred embodiments of a chimney which is not removed partly or entirely for refueling, the chimney has movable parts which allow its reconfiguration. In a first configuration suitable for normal reactor operation, the chimney is radially constricted such that the chimney obstructs vertical removal of the fuel assemblies. In a second configuration suitable for refueling, the parts of the chimney which obstruct fuel assembly removal in the first configuration are moved radially outward to positions whereat fuel assembly removal is not obstructed. This eliminates the need to remove the chimney from the reactor during refueling.

DETAILED DESCRIPTION OF THE PREFERRED EMBODIMENTS

Boiling water nuclear reactors typically employ a chimney surrounding and defining an upper outlet plenum to increase the recirculation flow of coolant water through the fuel assemblies of the fuel core. In the operation of such natural circulation nuclear reactors, the maximum power per fuel assembly unit critically depends upon this recirculation coolant flow through the fuel core.

A current design for natural circulation boiling water reactors includes a chimney of about 10 meters in height which occupies a significant volume within the reactor pressure vessel. As noted above, the density of the mixture of steam and hot water emerging from the fuel core and passing upward through the core outlet plenum surrounded by the chimney can be less than 25% that of room-temperature water.

The level of the coolant water within the annular downcomer external to the core outlet plenum will lower significantly as the available water is redistributed between both areas of the plenum and the downcomer, if the nuclear reaction is suddenly stopped by accident or due to action of the reactor safety system. This lower level of coolant water in the annular downcomer may activate engineered safety features—such as an isolation condenser, safety injection means and containment isolation measures—with undesirable high frequency. If the level drops to that indicative of a large leak, a depressurization will exhaust steam to the containment.

The present invention provides means for reducing the volume of the core outlet plenum containing the lower-density mixture of steam and water emerging from the fuel core without detracting from the height of the chimney defining this plenum and its designed functions. This enhances the supply of coolant water retained within the reactor pressure vessel and available for natural circulation cooling of the fuel core throughout any accidental interruption of normal reactor operation. Moreover, the measures of this invention do not impede access to the fuel core from overhead during refueling operations and all areas and fuel assemblies of the core remain easily reachable. By increasing the supply of coolant water, initiation of emergency systems can be avoided during minor operational transients, such as fast shutdown of the reactor, and will still be accomplished when required, such as breaks in large pipes connected to the reactor.

Figure 1:
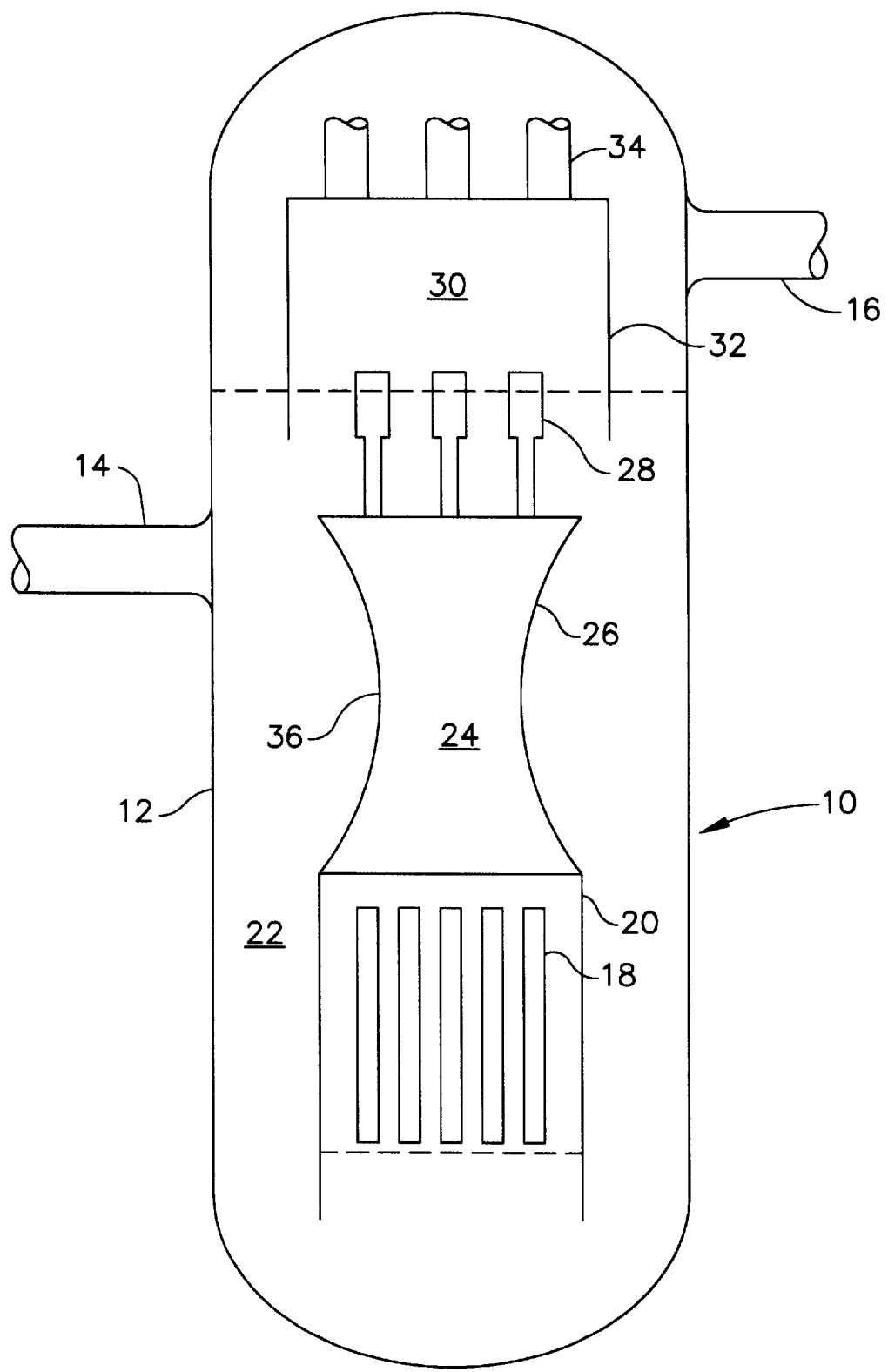
FIG. 1 is a diagram of a natural circulation type boiling water nuclear reactor incorporating a chimney in accordance with the preferred embodiment of the invention.

Referring to FIG. 1, a boiling water reactor 10 comprises a reactor pressure vessel 12 having a feedwater inlet 14 for the introduction of recycled steam condensate and/or makeup coolant into the vessel 12, and a steam outlet 16 for the discharge of produced steam for appropriate work, such as driving electricity-generating turbines.

A core of heat-producing fissionable fuel 18 is located within a lower area of the pressure vessel 12. Fuel core 18 is surrounded by a core shroud 20 spaced inward from the wall of the pressure vessel 12 to provide an annular downcomer 22 forming a coolant flow path between the vessel wall and shroud. The fuel core is supported on an underlying core support plate and the upper portion of the fuel units of the core are held in spaced position with a top spacing grid plate.

Superimposed above the fuel core 18 and fuel core shroud 20 is an open area comprising the core outlet plenum 24 defined by a chimney 26 which extends upward from the fuel core shroud 20 to an upper portion of the reactor vessel 12. Chimney 26 and the fuel core shroud 20 are spaced radially inward from the wall of the reactor pressure vessel 12 to provide for the annular downcomer 22, which forms a coolant flow path between the vessel wall and shroud 20 and chimney 26 defining the fuel core and core outlet plenum, respectively.

Extending from the top portion of chimney 26 are a plurality of steam separators 28. Spaced a distance above the core outlet plenum 24 is an area comprising the wet steam plenum 30 defined by a peripheral shroud 32 with a top plate. Steam dryers 34 are mounted on the top plate for supplying separated and dried steam to steam outlet pipe 16.

Feedwater coolant enters the pressure vessel 12 through inlet 14 and mixes with cycling liquid water coolant separated from steam by the steam separators 28. The combined coolant water flows downward in the annular downcomer 22 between the side wall of vessel 12 and shroud 20 and chimney 26 to the bottom portion of the vessel 12. The circulating coolant water then reverses its direction around the bottom of the shroud 20 and flows upward through the lower core plenum and into and through the heat-producing core 18 of nuclear fuel, whereupon it emerges as a mixture of steam and liquid water into the core outlet plenum 24.

This recycling circuit of coolant is maintained continuously during operation of the reactor to remove heat from the fuel core 18. The circulating coolant, comprising a mixture of steam and water from the fuel core, passes up through the core outlet plenum 24 and into the steam separators 28, where separated steam phase is directed on upward to the dryers and the liquid water phase is shunted laterally to rejoin the circulating coolant water flowing downward through the annular downcomer 22 to again repeat the cycle.

Due to the open spaces within the fuel core 18, such as control rod slots and edge areas, as well as the concentrated heat in the core center area relative to the peripheral area, the ratio of produced steam bubbles to liquid water of the mixture emanating from the fuel core 18 and rising upward through core outlet plenum 24 varies considerably transversely across the core. This variation produces differences in the buoyancy of portions of the rising steam, which in turn results in large-scale eddies that reduce flow efficiency by decreasing the void fraction and buoyancy of the chimney fluid.

In accordance with this invention, a chimney 26 is provided having a geometry which is a body of revolution having a radius which is a minimum at an intermediate point along the chimney axis and which increases from the minimum radius to the top and bottom ends, as seen in FIG. 1. In accordance with the preferred embodiment, the chimney has a concave hyperbolic section 36, resulting in a central or intermediate constriction of the chimney which concentrates the upward-flowing stream of unevenly mixed phases of steam and water, forcing greater intermixing between the low-steam-content flow contributed by the low-power peripheral fuel assemblies and the high-steam-content flow contributed by the high-power central fuel assemblies, and reducing flow turbulence and/or eddies of the overall steam in the core outlet plenum 24. More significant is that this constriction reduces the volume of the core outlet plenum by the volume 38 indicated in FIG. 2. This reduces the volume of the lower-density mixture of steam and boiling water passing through the core outlet plenum 24, which mixture collapses in the event of a shutdown, thereby lowering the water level within the annular downcomer area external to the constricted chimney. Thus, the chimney of the invention makes more coolant water available for core cooling in the event of an accidental interruption or an interruption caused by the safety systems of the nuclear reactor.

Figure 2:
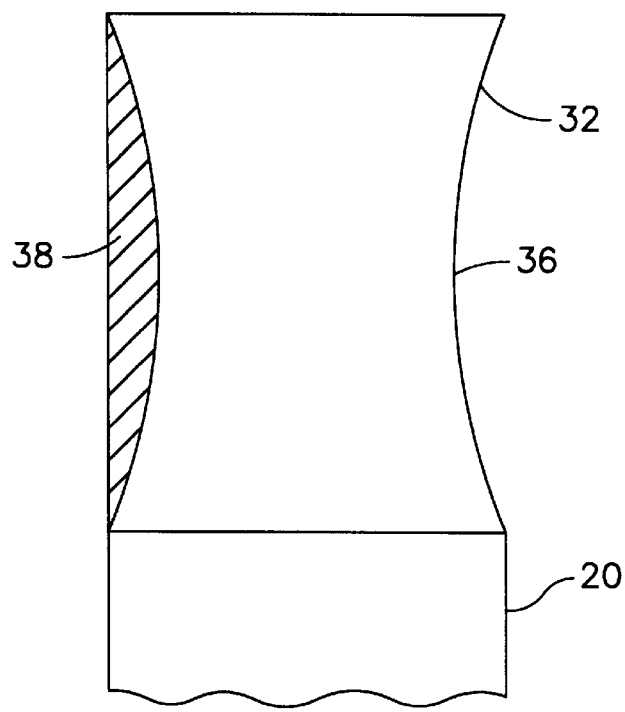
FIG. 2 is a diagram showing the concave profile of the chimney in accordance with the preferred embodiment of the invention.

The concave hyperbolic shape shown in FIGS. 1 and 2 is structurally suited for use in the invention. However, the present invention encompasses all shapes which are formed to reduce the volume of low-density water in the core outlet plenum and increase the volume of high-density water in the annulus. The shape will be optimized in practice to reduce the pressure drop and the recirculating eddies and at the same time to be easy to fabricate for the specific reactor application.

Figure 3:
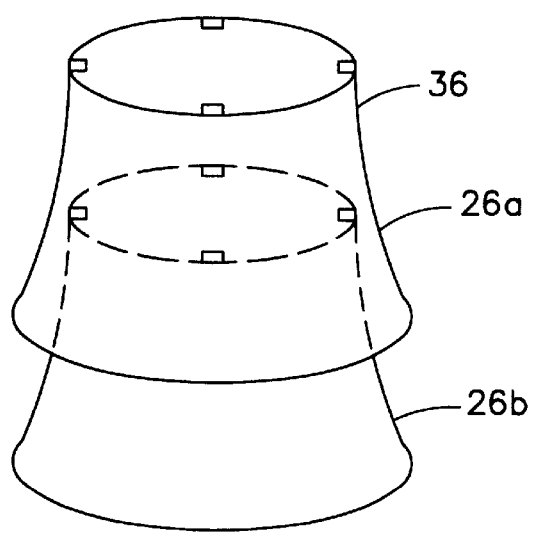
FIG. 3 is an isometric view of a detachable chimney having stackable parts for reduced storage volume in accordance with a first alternative preferred embodiment of the invention.

To facilitate refueling of the nuclear reactor by conventional means of lifting or lowering fuel assemblies from overhead up and out of or down and into the fuel core 18, the chimney 26 can be retained on the core shroud by bolts, which bolts are removed to allow the chimney to be lifted out from the reactor pressure vessel 12. To facilitate storage of the removed chimney during the refueling operation or maintenance service, the chimney can be constructed in two or more sections which can be dismantled and then stacked on top of each other, as shown in FIG. 3, inside a storage volume. Part 26a in FIG. 3 is the top half of the chimney after it has been rotated 180° about a radial axis and then stacked on top of the lower half 26b of the chimney. Each of the sections 26a and 26b is a body of revolution. The section has a first predetermined radius at the end where the sections are bolted together and a second predetermined radius greater than the first predetermined radius at the other end.

Figure 4A:
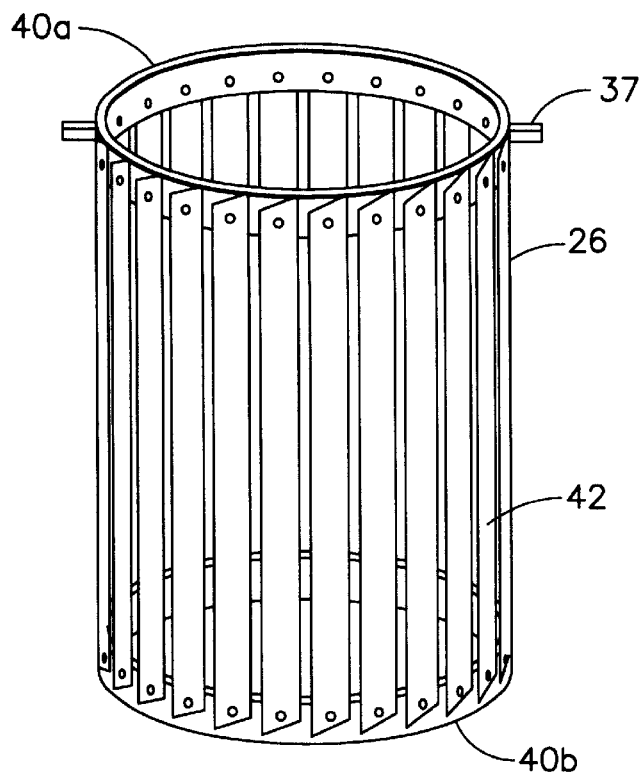
FIGS. 4a and 4b are isometric views of a chimney which can be reconfigured between a first configuration for refueling (FIG. 4a) and a second configuration for normal reactor operation (FIG. 4b) in accordance with a second alternative preferred embodiment of the invention.
Figure 4B:
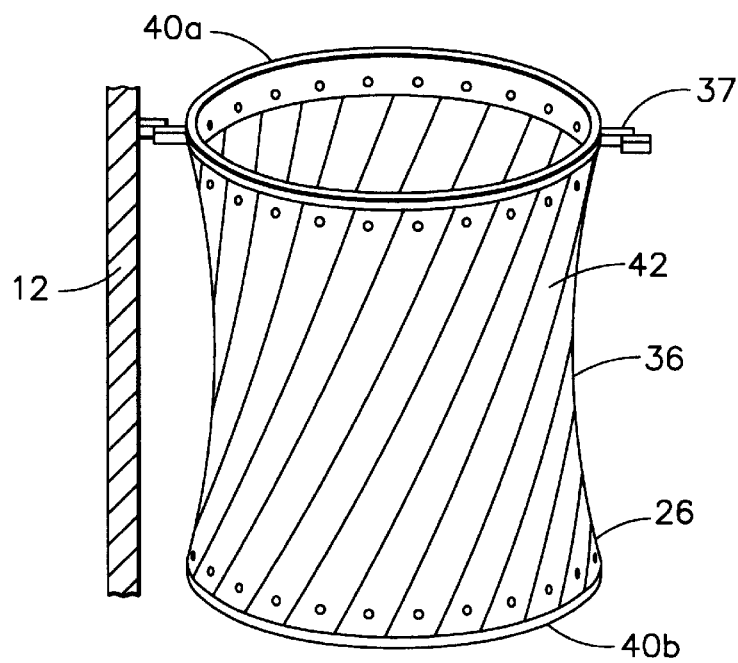

Another modification of this invention is shown in FIGS. 4a and 4b. In this embodiment a structure comprises upper and lower circular cylindrical support rings or hoops 40a and 40b which are coaxial. Rings 40a and 40b respectively pivotably support opposing ends of a plurality of parallel flexible panels 42. Each panel 42 has the shape of a parallelogram. When all of panels 42 are disposed parallel to the axis of the support rings (see FIG. 4a), the structure generally forms a circular cylinder, with adjacent panels being separated by a gap. When the upper ring 40a is rotated relative to the lower ring 40b (see FIG. 4b), the ends of each panel rotate relative to the corresponding support ring. As a result, the flexible panels 42 are twisted into a hyperbolic configuration, causing closure of the interpanel gaps. The chimney 26 is provided with first locking means 46 which engage second locking means 48 attached to the reactor pressure vessel. These locking means cooperate to latch the upper support ring 40a in the rotated position relative to lower support ring 40b. For example, the locking means may consist of respective lugs on the chimney and on the reactor pressure vessel which are brought into alignment and then bolted or clamped together. The chimney 26 in accordance with this preferred embodiment has a circular cylindrical configuration (FIG. 4a) to provide full access from overhead to the fuel core for refueling and/or maintenance. For normal reactor operation, when access to the fuel assemblies is not necessary, the chimney is twisted into the constricted configuration. This configuration inherently introduces the possibility of leakage flow from the chimney back to the downcomer. The amount of leakage can be controlled by labyrinth seals, or seals made of graphite or equivalent material with some elasticity at high temperature and high pressure, incorporated in the contact edges of the panels. Additionally, the leakage may be reduced by decreasing the panel flexibility from that required for flat panels, by using more rigid panels, formed as strips or sections of a hyperbola of revolution. The potential for gaps between the contact edges in the twisted configuration can thus be reduced.

Figure 5A:
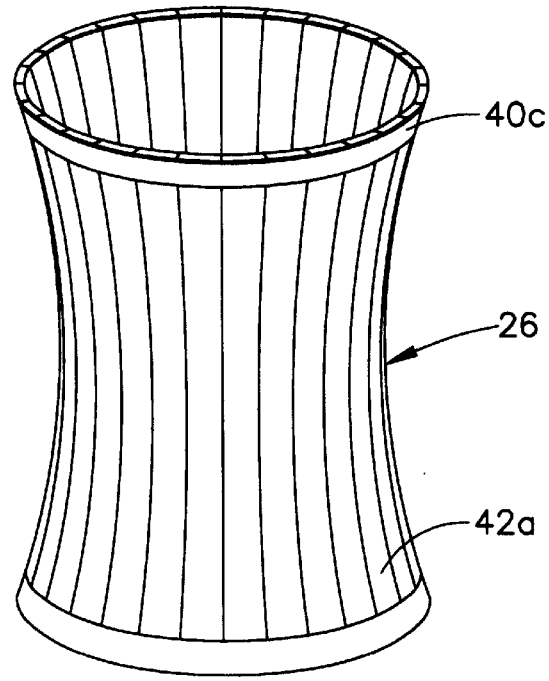
FIG. 5a is an isometric view of a chimney which is partly disassembled to facilitate refueling in accordance with a third alternative preferred embodiment of the invention.
Figure 5B:
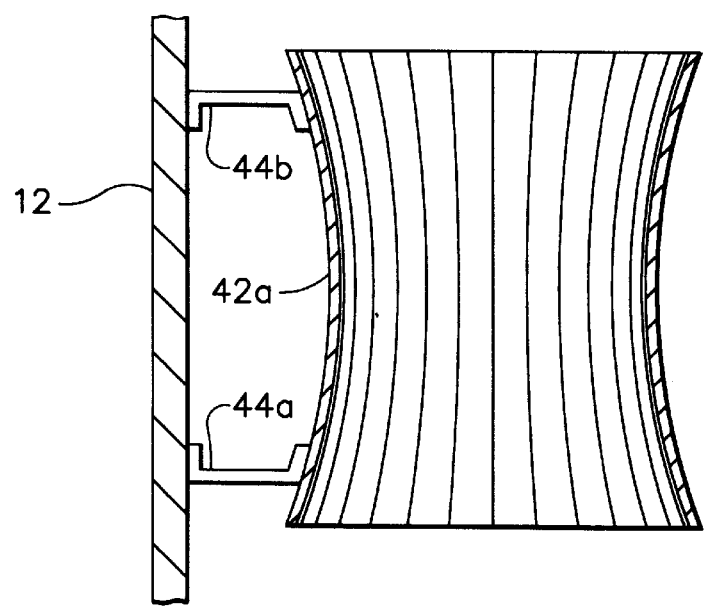
FIG. 5b is an elevation view of a chimney which is partly disassembled to facilitate refueling in accordance with a fourth alternative preferred embodiment of the invention.

Still another variation of the invention, as shown in FIGS. 5a and 5b, comprises a plurality of separable and removable contoured panels 42a. The panels are arranged circumferentially to form a constricted chimney having a minimum transverse dimension at a central or intermediate point, with the transverse dimension increasing from that intermediate point to each end of the chimney. In the embodiment of FIG. 5a, the panels 42a are supported at opposing ends thereof by upper and lower support rings or hoops 40c. The panels 42a are attached to the rings 40c by means of removable fasteners, e.g., bolts (not shown). The upper and lower rings 40c are then attached to the reactor pressure vessel and the steam separator assembly (if the reactor utilizes steam separators) and to the top of the core shroud respectively, for example, by brackets (not shown).

In accordance with the embodiment of FIG. 5a, the core can be refueled without the necessity of removing the entire chimney structure. For example, panels 42a can be detached from the support rings 40c and then the core is refueled while the support rings 40c remain in place. During refueling, the removed panels can be stored in a volume which is small compared to the volume which would otherwise be required were the chimney to be removed from the reactor pressure vessel intact. The panels can be stored inside the reactor vessel in the annulus between the vessel wall and the core shroud 20. The complete flow area of this annulus is not necessary for core cooling during refueling.

Alternatively, less than all panels need to be removed to facilitate refueling, thereby further reducing the storage volume required. For example, the core can be refueled one quadrant at a time by removing the group of adjacent panels forming the 90° sector on the periphery of that quadrant. After one quadrant has been refueled, the associated panel or panels can be reinstalled and the panel or panels associated with the next quadrant can be removed.

Alternatively the contoured panels 42a can be secured together via respective pluralities of lower brackets 44a and upper brackets 44b, as seen in FIG. 5b. Brackets 44a and 44b are secured to the side wall of the reactor pressure vessel 12. Each panel 42a may be supported by a separate pair of brackets. Alternatively, groups of panels can be supported by the same pair of brackets. The panels may be bolted to the brackets and then the brackets are in turn bolted to the side wall of the reactor pressure vessel. The constricted chimney may have any number of sectors, although only three or four sectors is preferred. Each sector can be separately removed by detaching brackets 44a and 44b for that sector from the side wall of the reactor pressure vessel. One or all of the sectors of panels can be removed at any given time depending on the amount of storage volume available.

Figure 6D:
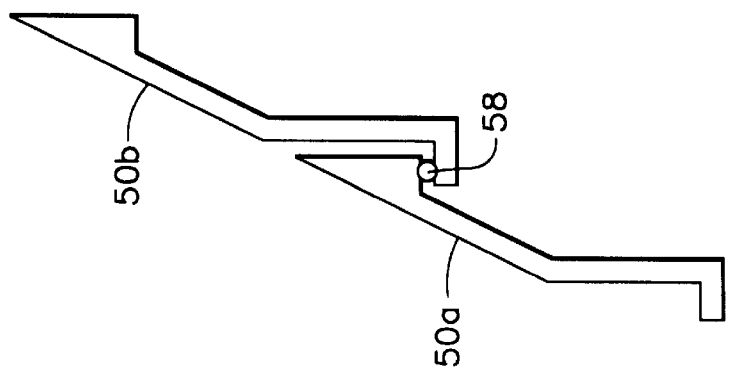
FIG. 6d is a diagram showing the placement of a seal between the adjacent conical sections of the collapsible chimney shown in FIG. 6b.
Figure 6A:
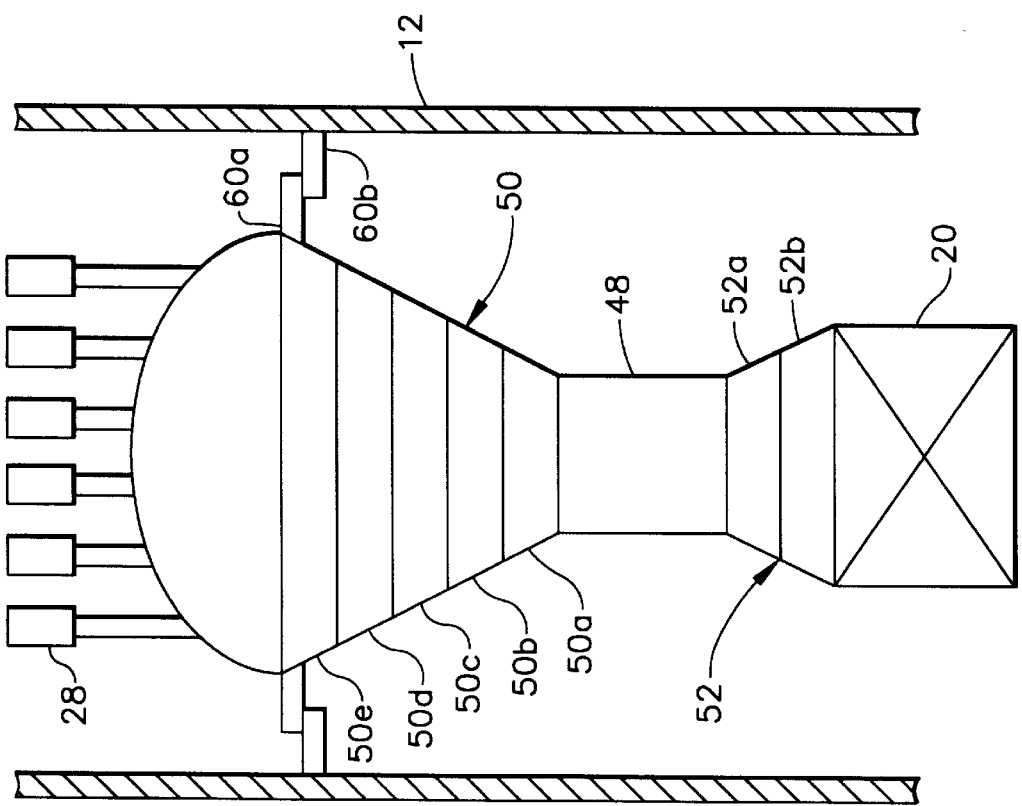
FIG. 6a is a diagram of a collapsible chimney in accordance with a fifth alternative preferred embodiment of the invention.

Another modification of this invention is depicted in FIGS. 6a–6d. Again the chimney has a concave profile in which the minimum radius is located at a central or intermediate point and then the radius increases from that minimum toward the opposing ends of the chimney. In this case, the chimney 46 is axially segmented to enable the chimney to be vertically collapsed to reduce the height of the storage volume required. The geometry of chimney 46 comprises a circular cylinder 48 connected at its top end to an upper truncated cone 50 and at its bottom end to a lower truncated cone 52. Alternatively, the upper and lower portions can be truncated sections of a hyperbola of revolution (not shown). The circular cylinder 48 has a predetermined diameter and the upper and lower truncated cones each have a minimum diameter equal to the predetermined diameter of the circular cylinder. FIG. 6a shows an axially segmented chimney in which the upper truncated cone 50 has five axial segments 50a–50e and the lower truncated cone 52 has two axial segments 52a and 52b. However, the broad concept of the present invention encompasses any number of axial segments.

In accordance with the invention, each truncated cone segment can be displaced vertically relative to the adjacent truncated cone segment. In addition, the truncated cone segments 50a and 52a can be displaced vertically relative to the circular cylinder 48. The uppermost axial segment 50e has lugs 60a which can be fastened by bolts (not shown) to and supported by lugs 60b attached to the reactor pressure vessel 12. Thus, the entire chimney is suspended from lugs 60b. Alternatively, any other conventional fastening technique can be used so long as the upper axial segment 50e is supported by the reactor pressure vessel at an elevation which allows room for the other axial segments to be suspended from the uppermost axial segment.

Figure 6B:
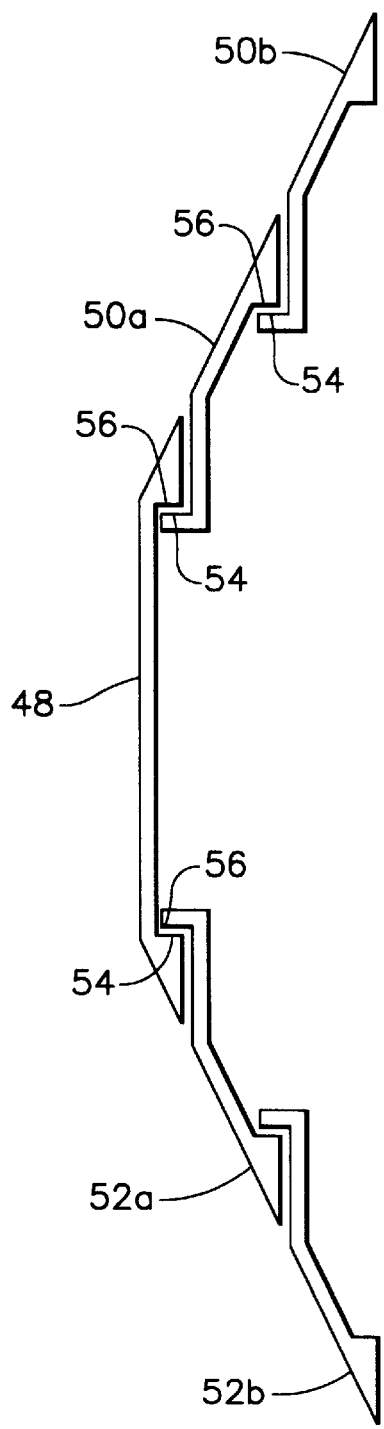
FIGS. 6b and 6c are diagrams showing a portion of the collapsible chimney of FIG. 6a in an uncollapsed state and in a collapsed state respectively.

Each axial segment is suspended from the segment immediately above it. For example, FIG. 6b shows five segments of the suspended chimney shown in FIG. 6a.

Each segment has a load-bearing annular surface 54 for supporting the chimney segments suspended therefrom and an annular seating surface 56 by means of which that same segment is supported by the chimney segment immediately above it. As best seen in FIG. 6d, a metal ring seal 58 is installed in opposing annular grooves or seats formed in the load-bearing surface 54 and in the seating surface 56. The seal 58 minimizes leakage from the downcomer annulus into the fuel core. Thermal expansion of the vessel wall 12 during operation will act to tension the structure and narrow the gaps which are closed by seals 58. The seal gap can be sized taking into account differential thermal expansion of vessel wall 12 versus the chimney segments.

Figure 6C:
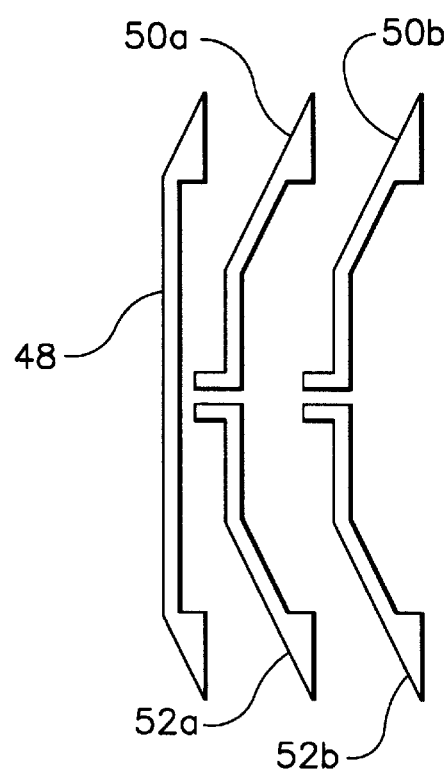

The entire axially segmented chimney structure can be collapsed into the storage configuration depicted in FIG. 6c. This reduces the height of the stored chimney to the height of the intermediate cylinder 48, thereby reducing the storage volume required for the chimney.

In accordance with the preferred embodiment shown in FIG. 6a, the cone-shaped segments hang from the upper end during normal reactor operation and are tensioned by attaching the bottom end of the chimney to the core shroud using bolts, clamps or quick disconnect fasteners. During refueling, the chimney structure can be collapsed outside the vessel by disconnecting the lower end from the core shroud; disconnecting the upper end from the reactor pressure vessel; lifting the fully extended chimney out of the reactor pressure vessel; and then lowering the fully extended chimney into an external storage pool until the chimney rests on the floor of the pool in the collapsed state depicted in FIG. 6c. Alternatively, the chimney can be collapsed inside the reactor pressure vessel; lifted out of the reactor pressure vessel; and lowered into the external storage pool. The chimney can be collapsed inside the vessel by disconnecting the lower end from the core shroud and then raising the lower end toward the upper end; or by disconnecting the upper end from the reactor pressure vessel and then lowering the upper end toward the lower end.

The preferred embodiments of the invention have been disclosed for the purpose of illustration. Variations and modifications of the disclosed structures which do not depart from the concept of this invention will be readily apparent to engineers skilled in the design of nuclear reactors. All such variations and modifications are intended to be encompassed by the claims set forth hereinafter.

We claim:

1. A boiling water reactor comprising a reactor pressure vessel, a core shroud arranged concentrically inside said reactor pressure vessel, a nuclear fuel core arranged inside said core shroud, a chimney arranged on top of said core shroud and in flow communication with said nuclear fuel core, and a plurality of steam separators arranged at the top of and in flow communication with said chimney, said chimney comprising a first axial portion which gradually decreases in radius from a first elevation to a second elevation, said second elevation being higher than said first elevation, a second axial portion which gradually increases in radius from a third elevation to a fourth elevation, said third elevation being higher than said second elevation, and said fourth elevation being higher than said third elevation, and a third axial portion of minimum radius connected to and in flow communication with a top of said first axial portion and a bottom of said second axial portion, said first axial portion comprising a first plurality of partially vertically overlapping axial segments, and said second axial portion comprising a second plurality of partially vertically overlapping axial segments.

2. A boiling water reactor comprising a reactor pressure vessel, a core shroud arranged concentrically inside said reactor pressure vessel, a nuclear fuel core arranged inside said core shroud, and a chimney arranged on top of said core shroud and in flow communication with said nuclear fuel core, said chimney comprising an intermediate section having an upper end at a first elevation and a lower end at a second elevation lower than said first elevation, an upper section having an upper end at a third elevation higher than said first elevation and a lower end at a fourth elevation between said first and second elevations, and a lower section having an upper end at a fifth elevation between said second and fourth elevations and a lower end at a sixth elevation lower than said second elevation, said upper section having an inner radius which increases with increasing elevation, said lower section having an inner radius which decreases with increasing elevation, said intermediate section being constricted relative to said upper and lower sections, said upper end of said upper section being fastened to said reactor pressure vessel, said lower end of said upper section extending underneath said upper end of said intermediate section, said lower end of said intermediate section extending underneath said upper end of said lower section, and said lower end of said lower section being fastened to said shroud.

3. The boiling water reactor as defined in claim 2, wherein said upper end of said intermediate section comprises a first annular seating surface, said lower end of said intermediate section comprises a first annular load-bearing surface, said upper end of said lower section comprises a second annular seating surface, and said lower end of said upper section comprises a second annular load-bearing surface, said first annular seating surface being opposed to said second annular load-bearing surface and said first load-bearing surface being opposed to said second annular seating surface.

4. The boiling water reactor as defined in claim 2, further comprising a first ring seal arranged between said first annular seating surface and said second annular load-bearing surface, and a second ring seal arranged between said second annular seating surface and said first annular load-bearing surface.

5. The boiling water reactor as defined in claim 2, wherein said intermediate section has a circular cylindrical flow channel, said upper section has a truncated conical flow channel in fluid communication with said flow channel of said intermediate section, and said lower section has a truncated conical flow channel in fluid communication with said flow channel of said intermediate section.

6. The boiling water reactor as defined in claim 2, wherein said upper section comprises first and second axial segments, said first axial segment having an upper end at a seventh elevation higher than said first elevation and lower than said third elevation and a lower end at said fourth elevation, and said second axial segment extending higher than said seventh elevation and having a lower end at an eighth elevation higher than said first elevation and lower than said seventh elevation, said lower end of said second axial segment extending underneath said upper end of said first axial segment.

7. The boiling water reactor as defined in claim 2, wherein said lower section comprises first and second axial segments, said first axial segment having an upper end at said fifth elevation and a lower end at a seventh elevation lower than said second elevation and higher than said sixth elevation, and said second axial segment extending lower than said seventh elevation and having an upper end at an eighth elevation higher than said seventh elevation and lower than said second elevation, said lower end of said first axial segment extending underneath said upper end of said second axial segment.

8. The boiling water reactor as defined in claim 2, wherein upper end of said intermediate section has an outer diameter greater than an inner diameter of said lower end of said upper section, and said lower end of said intermediate section has an outer diameter greater than an inner diameter of said upper end of said lower section.

9. The boiling water reactor as defined in claim 2, wherein said upper section of said chimney comprises a first plurality of partially vertically overlapping axial segments, and said lower section comprises a second plurality of partially vertically overlapping axial segments, said axial segments of said first and second pluralities being free to displace independently in a direction of increasing vertical overlap with said intermediate section when said upper end of said upper section is detached from said reactor pressure vessel or when said lower end of said lower section is detached from said shroud, whereby said chimney can be vertically collapsed to have a height less than a height equal to the difference between said third and sixth elevations.

10. A boiling water reactor comprising a reactor pressure vessel, a core shroud arranged concentrically inside said reactor pressure vessel, a nuclear fuel core arranged inside said core shroud, and a chimney arranged on top of said core shroud and in flow communication with said nuclear fuel core, said chimney comprising an upper section having an upper end attached to said reactor pressure vessel, a lower end and a first flow channel which increases in radius with increasing elevation, a lower section having a lower end attached to said shroud, an upper end and a second flow channel which increases in radius with decreasing elevation, and an intermediate section arranged between said upper and lower sections and having an upper end which vertically overlaps said lower end of said upper section, a lower end which vertically overlaps said upper end of said lower section and a third flow channel in flow communication with and constricted relative to said first and second flow channels, said upper section comprising a first plurality of partially vertically overlapping axial segments, and said lower section comprising a second plurality of partially vertically overlapping axial segments, said axial segments of said first and second pluralities being free to displace independently in a direction of increasing vertical overlap with said intermediate section when said upper end of said upper section is detached from said reactor pressure vessel or when said lower end of said lower section is detached from said shroud.

11. The boiling water reactor as defined in claim 10, wherein said lower section comprises a first axial segment having an upper end and a lower end and a second axial segment having an upper end and a lower end, said upper end of said first axial segment vertically overlapping said lower end of said intermediate section, and said upper end of said second axial segment vertically overlapping said lower end of said first axial segment, further comprising a first ring seal arranged between said upper end of said first axial segment and said lower end of said intermediate section, and a second ring seal arranged between said upper end of said second axial segment and said lower end of said first axial segment.

12. The boiling water reactor as defined in claim 10, wherein said upper section comprises a first axial segment having an upper end and a lower end and a second axial segment having an upper end and a lower end, said lower end of said first axial segment vertically overlapping said upper end of said intermediate section, and said lower end of said second axial segment vertically overlapping said upper end of said first axial segment, further comprising a first ring seal arranged between said lower end of said first axial segment and said upper end of said intermediate section, and a second ring seal arranged between said lower end of said second axial segment and said upper end of said first axial segment.

13. A boiling water reactor comprising a reactor pressure vessel, a core shroud arranged concentrically inside said reactor pressure vessel, a nuclear fuel core arranged inside said core shroud, and a chimney arranged on top of said core shroud and in flow communication with said nuclear fuel core, said chimney comprising an upper section having an upper end attached to said reactor pressure vessel, a lower end and a first flow channel which increases in radius with increasing elevation, a lower section having a lower end attached to said shroud, an upper end and a second flow channel which increases in radius with decreasing elevation, and an intermediate section arranged between said upper and lower sections and having an upper end which vertically overlaps said lower end of said upper section, a lower end which vertically overlaps said upper end of said lower section and a third flow channel in flow communication with and constricted relative to said first and second flow channels, said upper section comprising a first plurality of partially vertically overlapping axial segments, and said lower section comprising a second plurality of partially vertically overlapping axial segments, further comprising a first ring seal arranged between said upper end of said intermediate section and said lower end of said upper section, and a second ring seal arranged between said lower end of said intermediate section and said upper end of said lower section.

14. The boiling water reactor as defined in claim 13, wherein said lower section comprises a first axial segment having an upper end and a lower end and a second axial segment having an upper end and a lower end, said upper end of said first axial segment vertically overlapping said lower end of said intermediate section, and said upper end of said second axial segment vertically overlapping said lower end of said first axial segment, further comprising a third ring seal arranged between said upper end of said second axial segment and said lower end of said first axial segment.

15. The boiling water reactor as defined in claim 13, wherein said upper section comprises a first axial segment having an upper end and a lower end and a second axial segment having an upper end and a lower end, said lower end of said first axial segment vertically overlapping said upper end of said intermediate section, and said lower end of said second axial segment vertically overlapping said upper end of said first axial segment, further comprising a third ring seal arranged between said lower end of said second axial segment and said upper end of said first axial segment.

* * * * *